(12) United States Patent
Jankin et al.

(10) Patent No.: US 11,408,540 B2
(45) Date of Patent: Aug. 9, 2022

(54) TUBE COUPLING ASSEMBLY (71) Applicant: General Electric Company, Schenectady, NY (US)

(72) Inventors: Greedaran Kubendran Jankin, Bangalore (IN); Vinod Shashikant Chaudhari, Bangalore (IN); Dattu G. V. Jonnalagadda, Bangalore (IN); Sandeep Kumar, Bangalore (IN); Rachamadugu Sivaprasad, Bangalore (IN); Ramana Reddy Kollam, Bangalore (IN); Merin Sebastian, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 970 days.

(21) Appl. No.: 15/716,580

(22) Filed: Sep. 27, 2017

(65) Prior Publication Data
US 2019/0093800 A1 Mar. 28, 2019

(51) Int. Cl.
F16L 19/00 (2006.01)
F16L 27/04 (2006.01)
F16L 37/252 (2006.01)

(52) U.S. Cl.
CPC .............. F16L 19/005 (2013.01); F16L 27/04 (2013.01); F16L 37/252 (2013.01)

(58) Field of Classification Search
CPC ....... F16L 19/005; F16L 27/04; F16L 37/107; F16L 37/113; F16L 37/248; F16L 37/252
See application file for complete search history.

(56) References Cited

U.S. PATENT DOCUMENTS

| 551,733 | A | * | 12/1895 | Mullenhoff | |
| 1,029,819 | A | * | 6/1912 | Nylander | F16L 37/252 285/88 |
| 3,329,190 | A | | 7/1967 | Oldenknott | |
| 4,172,606 | A | | 10/1979 | Howe | |
| 4,280,723 | A | * | 7/1981 | Moldestad | F16L 37/113 285/376 |
| 5,188,398 | A | * | 2/1993 | Parimore, Jr | F16L 19/005 285/39 |
| 5,215,336 | A | * | 6/1993 | Worthing | F16L 19/005 285/319 |
| 5,350,200 | A | | 9/1994 | Peterson et al. | |
| 5,362,111 | A | | 11/1994 | Harbin | |
| 5,678,607 | A | * | 10/1997 | Krywitsky | F16L 15/001 138/89 |
| 6,050,609 | A | | 4/2000 | Boscaljon et al. | |
| 6,302,447 | B1 | | 10/2001 | Lee | |

(Continued)

FOREIGN PATENT DOCUMENTS

| CA | 2634310 C | 11/2000 |
| WO | 2009124171 A1 | 10/2009 |

Primary Examiner — James M Hewitt, II
(74) Attorney, Agent, or Firm — Venable LLP; Elizabeth C. G. Gitlin; Michele V. Frank (57) ABSTRACT A tube coupling assembly is disclosed, which comprises a first connector for connecting to a tube; a second connector for jointing with the first connector; a first member is adapted to mount on the first connector and operably affixable to the second connector; and a second member is adapted to mount on the second connector, and is capable of being engaged with the first member to prevent separation between the first connector and the second connector.

15 Claims, 7 Drawing Sheets

(56) References Cited

U.S. PATENT DOCUMENTS

| | | |
|---|---|---|
| 6,478,343 B2 | 11/2002 | King Lee |
| 6,857,665 B2 | 2/2005 | Parker-Hannifin |
| 6,905,142 B2 | 6/2005 | Do et al. |
| 7,146,704 B2 | 12/2006 | Otten et al. |
| 7,571,937 B2 | 8/2009 | Patel |
| 7,600,789 B2 | 10/2009 | Vyse et al. |
| 8,123,259 B2 | 2/2012 | Swart et al. |
| 8,474,876 B2 | 7/2013 | Watterson, II et al. |
| 8,523,240 B2 | 9/2013 | Murphy et al. |
| 8,641,099 B2 | 2/2014 | Cuva et al. |
| 8,794,679 B2 | 8/2014 | Yamamoto et al. |
| 8,840,348 B2 | 9/2014 | Marc |
| 9,188,261 B2 | 11/2015 | Marc et al. |
| 2006/0061094 A1 | 3/2006 | Vyse |
| 2007/0164566 A1 | 7/2007 | Patel |
| 2007/0267869 A1 | 11/2007 | Patel |
| 2013/0221659 A1 | 8/2013 | Marc |
| 2014/0056666 A1 | 2/2014 | Marc |
| 2015/0063939 A1 | 3/2015 | Marc |
| 2015/0204242 A1 | 7/2015 | Clarke |
| 2015/0330436 A1 | 11/2015 | Marc |
| 2016/0273685 A1* | 9/2016 | Considine ............... F16L 21/08 |
| 2017/0370511 A1* | 12/2017 | Kiernan ................ F16L 37/113 |

* cited by examiner

TUBE COUPLING ASSEMBLY

BACKGROUND

This disclosure relates generally to a self-locking threaded attachment device for preventing separation of threaded attachment device.

In many circumstances, tubes or pipes are needed to be jointed together for allowing the continuous transmission of the fluids or gases. Usually the tubes or pipes are joined by using thread. In order to prevent undesired separation of the connected tubes or pipes, a safety mechanism needs to be designed for tube coupling.

In one example, gas turbine engines and aircraft engines such as those used for aircraft propulsion necessarily include external tubing systems for delivering fluids, either gases or liquids, from one engine component to another or for connecting an engine component with an aircraft system. These tubing systems may include tube coupling assemblies, of various types, to connect adjacent fluid-carrying tubes or to connect a tube to another engine component.

On aircraft engines, the high pressure hydraulic/fuel systems are coupled with B-nut flanges. Some B-nut fluid couplings require secondary retention features to prevent coupling loosening during dynamic load conditions. Fluid couplings can get loose due to vibration or shocks causing risk of leakage while in operation.

Conventional secondary retaining mechanism uses safety cable, which requires special tools for assembly and disassembly of the fluid coupling. It is easy to install but not foolproof for human error in installation. If not installed properly it can cause foreign object damage, and risk of injury to the operator. This complicates field maintenance of systems that include safety cable. Other methods are available at a higher product cost.

BRIEF DESCRIPTION

In one embodiment, the present disclosure provides a tube coupling assembly, which comprises a first connector for connecting to a tube; a second connector for jointing with the first connector; a first member is adapted to mount on the first connector and operably affixable to the second connector; and a second member is adapted to mount on the second connector, and is capable of being engaged with the first member to prevent separation between the first connector and the second connector.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The terms such as "front," "back," "bottom," and/or "top," unless otherwise noted, are merely used for convenience of description, and are not limited to any one position or spatial orientation. The term "or" is meant to be inclusive and mean either or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
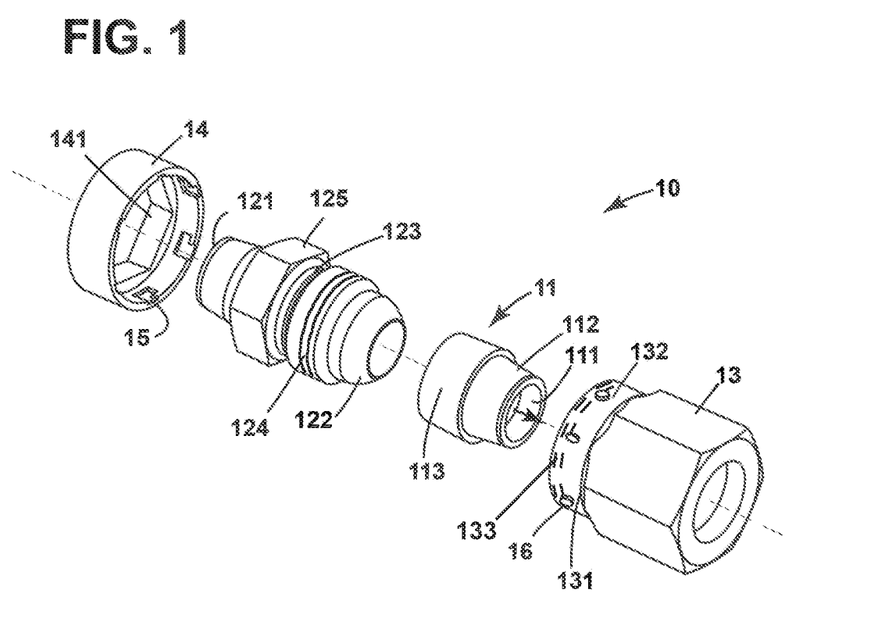
FIG. 1 is an exploded view of a tube coupling assembly, in accordance with an embodiment of the present disclosure.
Figure 2:
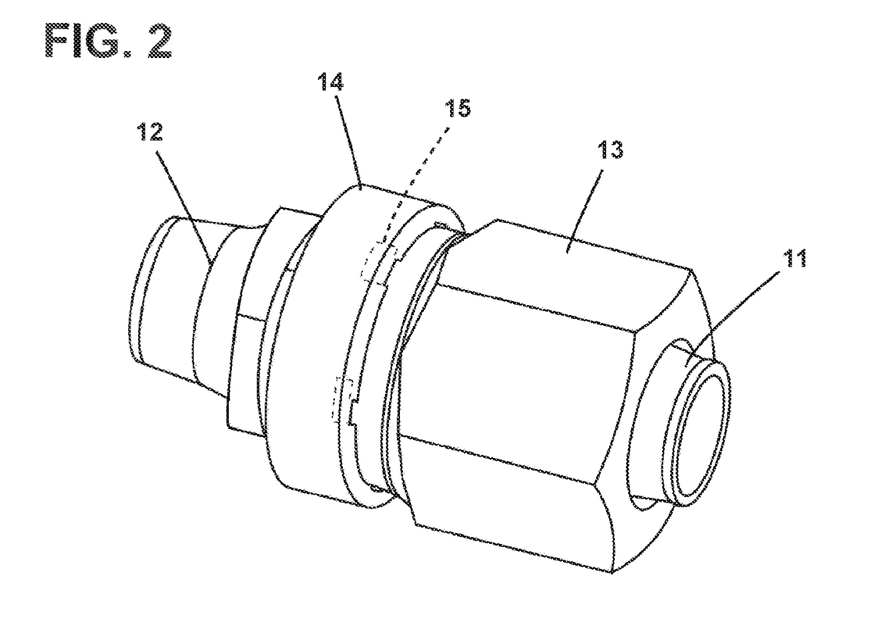
FIG. 2 is a perspective view of a tube coupling assembly, in accordance with an embodiment of the present disclosure.

Referring to FIGS. 1 and 2 of the drawings, the present disclosure provides a tube coupling assembly 10 comprising a first connector 11 for connecting to a tube (not shown); a second connector 12 for jointing with the first connector 11; a first member 13 is adapted to mount on the first connector and operably affixable to the second connector; and a second member 14 is adapted to mount on the second connector, wherein the first member 13 is capable of being engaged with the second member 14 to prevent separation between the first connector 11 and the second connector 12.

In one embodiment, one of the first member 13 and the second member 14 has a plurality of recesses 15, and another one of the first member and the second member has a plurality of projections 16 that is capable of being engaged with the recesses 15.

In one embodiment as shown in FIG. 1, the second connector 12 is for connecting another tube (not shown), so that the second connector 12 joints with the first connector 11 for connecting the tubes and communicating fluid including liquid or gas between the tubes. The first connector 11 has a circular inner space 111 for communicating fluid, and comprises a first part 112 on a rear end thereof for connecting with an end portion of a tube (not shown) and a second part 113 with larger outer diameter than the first part 112 for being mounted on the front end of the first member 13 and for connecting with the second connector 12. The second connector 12 has a circular inner space 121 for communicating fluid, and comprises a rear end thereof for connecting with another tube (now shown), and a front part 122 for fitting with the first connector. In the embodiment of FIG. 1, the first connector 11 and the second connector 12 is ball-nose fitting, the front part 122 of the second connector 12 is ball-shaped. In other embodiments, the first connector 11 and the second connector 12 can be nipple fitting or any other tube fitting. The second connector 12 also comprises a stage 123 on the back of the ball-shaped front part. On the back of the stage, there is an outer thread 124 on the second connector, and on the back of the outer thread, there is a shoulder 125. The shoulder 125 has a hexagon outer shape. The rear end of the second connector 12 is provided on the back of the shoulder 125.

The first member 13 comprises a flange 131 at rear end thereof, and a connecting part 132 at front end thereof. The first member 13 has an inner thread 133 on the inner side of the connecting part 132 of for connecting with the outer thread 124 of the second connector 12. The first member 13 comprises a plurality of projections 16 spacedly apart provided around the connecting part 132. The first member is B-nut in some embodiments. The second member 14 is embodied as a sleeve which is ring-shaped. The second member 14 has an inner shape 141 corresponding with the shoulder 125 at a rear end thereof so as to secure on the shoulder 125 of the second connector 12. In this embodiment, the second member 14 has an inner shape 141 of hexagon corresponding with the hexagon outer shape of the shoulder 125 of the second connector 12. Inside a front end of the second member 14, there are a plurality of recesses 15 spacedly apart provided. In the embodiment of FIG. 1, the recess 15 is L-shaped groove extending from the front edge inside forming a longitudinal pass and extending transversely forming a transverse pass.

After the first member 13 is screwed onto the second connector 12 via the left-hand or right-hand thread of the outer thread 124 and inner thread 133, put the second member 14 onto the connecting part 132 of the first member 13. The projections 16 on the first member 13 will move inside the longitudinal pass of the L-shaped groove 15 in and rotate the second member 14 a little bit to move the projections 16 into the transverse pass of the L-shaped groove, so as to prevent the rotation between the first member 13 and the second connector 12 under vibration and other loads. Thereby the separation or dislocation of the first connector 11 and the second connector 12 can be prevented. FIG. 2 shows an assembled tube coupling assembly of FIG. 1.

Figure 3:
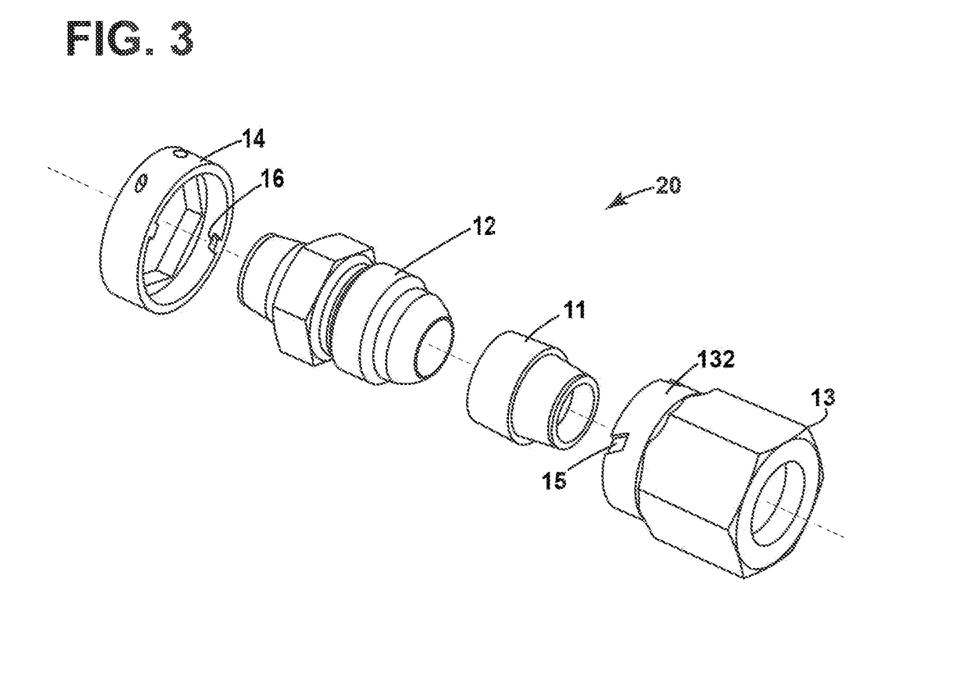
FIG. 3 is an exploded view of a tube coupling assembly, in accordance with second embodiment of the present disclosure.
Figure 4:
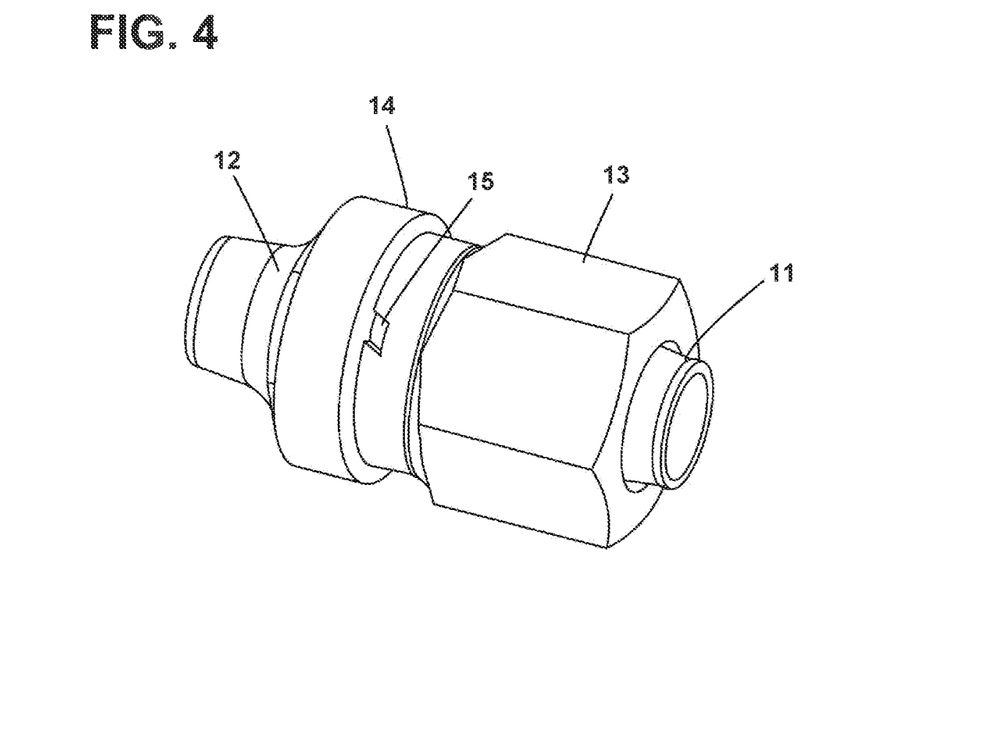
FIG. 4 is a perspective view of a tube coupling assembly, in accordance with second embodiment of the present disclosure.

Tube coupling assembly 20 of FIG. 3, the recesses 15 are provided on the connecting part 132 of the first member 13 instead of projections of FIG. 1, and the projections 16 are provided inside the front end of the second member 14. In this embodiment, the recess 15 is an inclined groove, which extends inward not perpendicularly, and the projection 16 is inclined in shape corresponding to the inclined groove so as to fitting into the inclined groove. After the first member 13 is screwed onto the second connector 12, put the second member 14 onto the connecting part 132 of the first member 13. The projections 16 on the second member 14 will move inside the inclined groove on the first member 13, so as to prevent the rotation between the first member 13 and the second connector 12. Thereby the separation or dislocation of the first connector 11 and the second connector 12 can be prevented. FIG. 4 shows an assembled tube coupling assembly.

Figure 5:
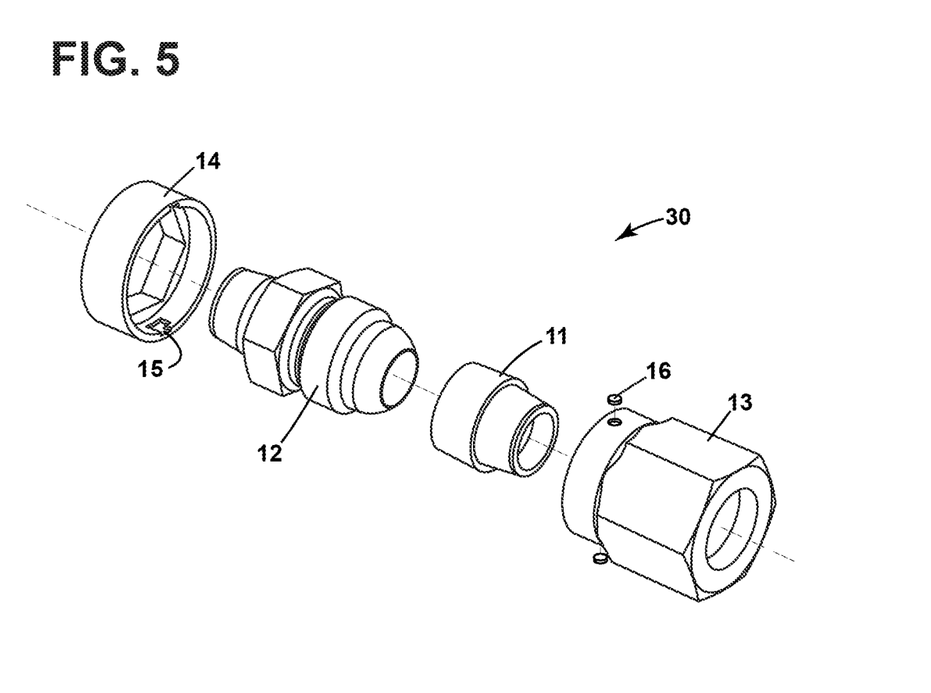
FIG. 5 is an exploded view of a tube coupling assembly, in accordance with third embodiment of the present disclosure.

Tube coupling assembly 30 of FIG. 5 is similar to the embodiment of FIG. 1. The projection 16 is detachably mounted on the first member.

Figure 6:
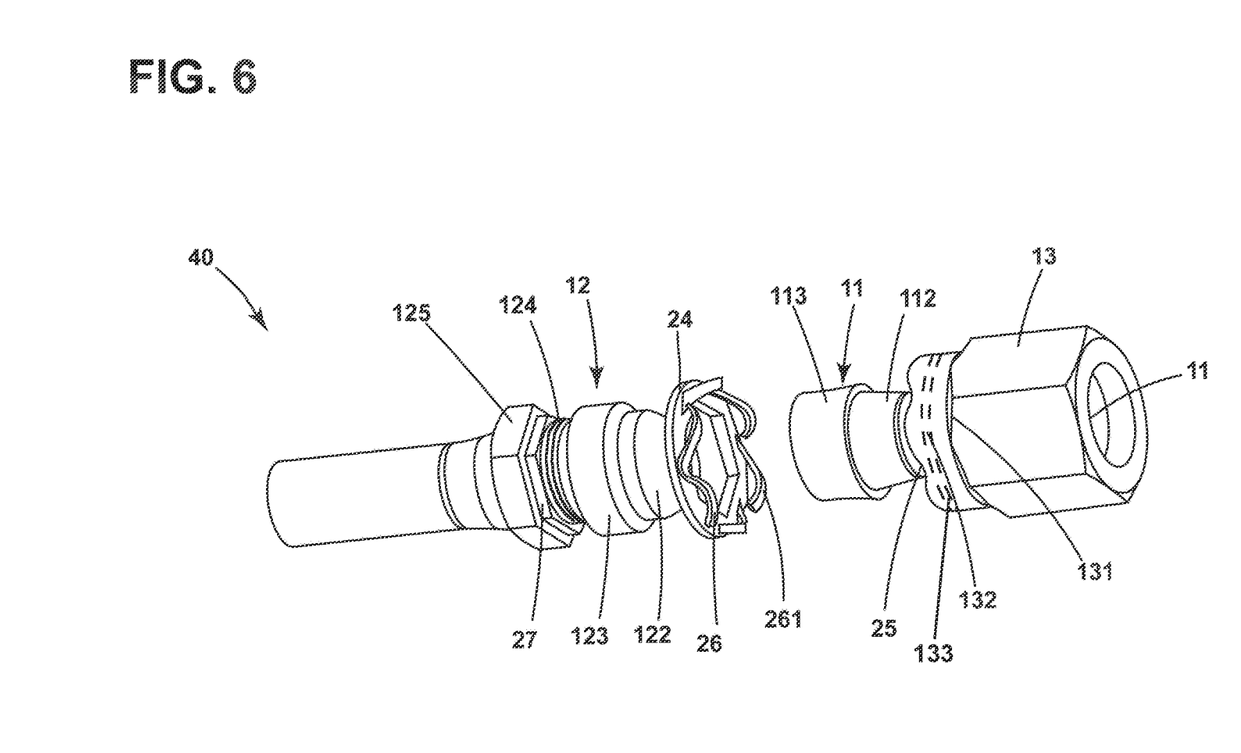
FIG. 6 is an exploded view of a tube coupling assembly, in accordance with fourth embodiment of the present disclosure.

Referring to FIG. 6 of the drawings, a tube coupling assembly 40 is shown. The second connector 12 is for connecting another tube (not shown), so that the second connector 12 joints with the first connector 11 for connecting the tubes and communicating fluid between the tubes. The first connector 11 has a circular inner space 111 for communicating fluid, and comprises a first part 112 on a rear end thereof for connecting with an end portion of a tube (not shown) and a second part 113 with larger outer diameter than the first part 112 for being mounted on the front end of the first member 13 and for connecting with the second connector 12. The second connector 12 has a circular inner space for communicating fluid, and comprises a rear end thereof for connecting with another tube (not shown), and a front part 122 for fitting with the first connector 11. In the embodiment of FIG. 6, the first connector 11 and the second connector 12 is ball-nose fitting, the front part 122 of the second connector 12 is ball-shaped. In other embodiments, the first connector 11 and the second connector 12 can be nipple fitting or any other tube fitting. The second connector 12 comprises a stage 123 on the back of the ball-shaped front part. On the back of the stage 123, there is an outer thread 124 on the second connector, and on the back of the outer thread, there is a shoulder 125. The shoulder 125 has a hexagon outer shape. Between the outer thread 124 and the shoulder 125, there is a collar 27 with hexagon outer shape provided on the second connector 12. The rear end of the second connector 12 is provided on the back of the shoulder 125.

The first member 13 comprises a flange 131 at rear end thereof, and a connecting part 132 at front end thereof. The first member 13 comprises an inner thread 133 on the inner side of the connecting part 132 of for connecting with the outer thread 124 of the second connector 12. The first member 13 has a plurality of recesses 25 spacedly apart provided on the outer edge around the connecting part 132. The first member is B-nut in some embodiments. The second member comprises a ring 24, and the projections 26 are embodied as springs provided on the ring 24. The ring 24 has an inner shape corresponding with the collar 27 with hexagon outer shape provided between the outer thread 124 and the shoulder 125 of the second connector 12, and rest on the collar 27 when assembled to keep the ring 24 from rotating around the second connector 12. The projection 26 comprises a piece of metal sheet 261 with one end fixed on the ring and the other end extend up and along the ring for a distance forming a shape corresponding with the recess 25 of the first member 13. The angle formed between the metal sheet 261 and the surface of the ring is between 0-90 degree, and preferably between 25-65 degree.

Figure 7:
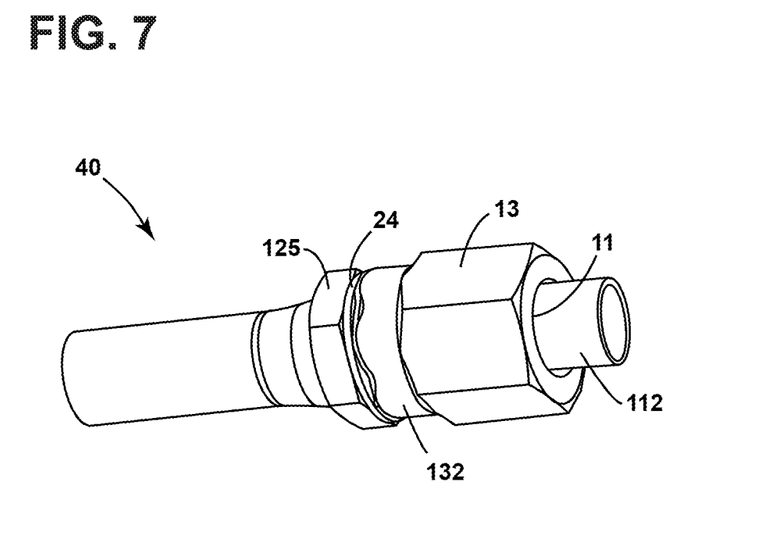
FIG. 7 is a perspective view of a tube coupling assembly, in accordance with fourth embodiment of the present disclosure.

The ring with spring on it is called 'Lotus ring'. The spring comprises at least one flexible metal sheet arranged on one side of the ring. After the first member 13 is torqued onto the second connector 12 via the left-hand or right-hand thread, the metal sheet contacts the flat portion of the outer edge of the B-nut, and then further inward to engage the recess 25 of the first member 13 by releasing the metal sheet, so as to prevent the rotation between the first member 13 and the second connector 12 under vibration and other loads. Thereby the separation or dislocation of the first connector 11 and the second connector 12 can be prevented. FIG. 7 shows an assembled tube coupling assembly of FIG. 6.

Figure 8:
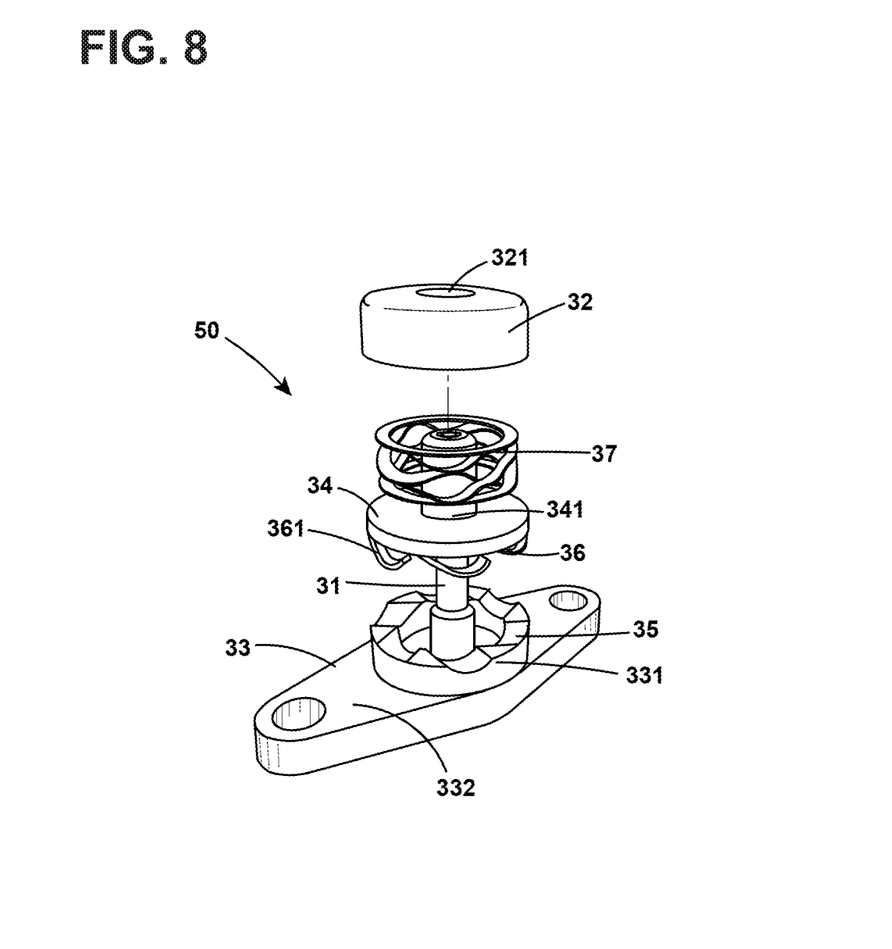
FIG. 8 is an exploded view of a tube coupling assembly, in accordance with fifth embodiment of the present disclosure.
Figure 9:
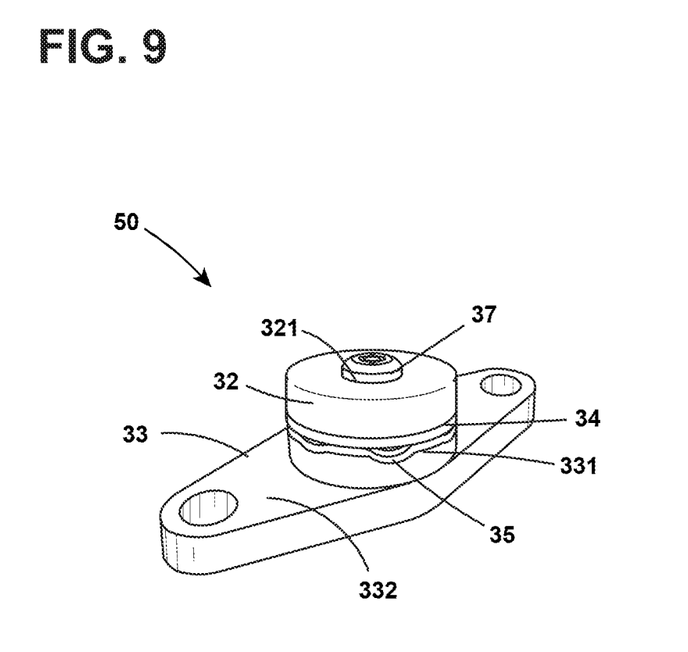
FIG. 9 is perspective view of a tube coupling assembly, in accordance with fifth embodiment of the present disclosure.

Referring to FIG. 8 of the drawings, a tube coupling assembly 50 is shown. The second connector is embodied as a cap 32 with a center hole 321 therethrough, so that the first connector 31 passes through the cap 32. The first connector 11 comprises a first part on a rear end thereof for connecting with an end portion of a tube (not shown) and a second part 31 at front end of the first member and for passing through the cap.

The first member 33 comprises a flange 332 at rear end thereof, and a connecting part 331 at front end thereof. The connecting part 331 has a circular outer shape for inserting into the cap 32. The connecting part 331 has a plurality of recesses 35 spacedly apart provided on the outer edge around the connecting part 331. The second member comprises a ring 34, and the projections 36 which is embodied as springs provided on the ring 34. The ring 34 has an inner circular hole 341 for allowing the first connector 31 to pass, and has a circular outer shape corresponding with the inner shape of the cap 32 so as to be mounted inside the cap 32. A wave spring 37 is provided between the cap 32 and the ring 34.

The projection 36 comprises a piece of metal sheet 361 with one end fixed on the ring 34 and the other end extend up and along the ring for a distance forming a shape corresponding with the recess 35 of the first member 33.

After the cap is put on the connecting part of the first member, the metal sheet contacts the flat portion between the recesses, and then further inward to engage the recess 35 of the first member 13 by releasing the metal sheet 361, so as to prevent the rotation between the first member 13 and the second connector 12 under vibration and other loads. Thereby the separation or dislocation of the first connector 11 and the second connector 12 can be prevented.

For all products, the material of the product can be plastic, metal, or any other material that can be used in this area. With this application, the following advantages can be achieved: 1) Reduced part count and cost; 2) Simple to manufacture and damage can be visually inspected; 3) Common solution for Fluid coupling as well as Borescope plugs across the engine; 4) Reduces the assembly and disassembly time; 5) Eliminates special tooling; 6) Eliminates EHS related issues with sharp safety cable ends; 7) Avoids FOD (Foreign object damage); 7) Simplified retention mechanism.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A tube coupling assembly, comprising:
    a first connector defining a longitudinal axis extending therethrough and having a first part on a rear end for connecting with an end portion of a tube and a second part with a larger outer diameter than the first part;
    a second connector jointed with the first connector, the second connector having the longitudinal axis extending therethrough, a shoulder having a hexagonal outer surface, a rear end for connecting to an end portion of another tube, and a front part for being received within the second part of the first connector, wherein the front part of the second connector and the second part of the first connector form a ball-nose fitting;
    a first member mounted over the first connector and threaded onto to the second connector, the first member having at least one projection extending radially with respect to the longitudinal axis; and
    a second member slidably received over the second connector, the second member having at least one recess inside a front end of the second member and a hexagonal inner surface,
    wherein each of the at least one projection is configured to be received in a corresponding recess of the at least one recess,
    wherein the at least one projection and the at least one recess engage the first member and the second member to prevent separation between the first connector and the second connector,
    wherein the hexagonal inner surface corresponds to the hexagonal outer surface so as to secure the shoulder of the second connector, and
    wherein the rear end of the second connector extends longitudinally past a distal surface of the second member.

2. The tube coupling assembly of claim 1, wherein the at least one recess comprises an L-shaped groove having a longitudinal pass and a transverse pass for receiving the at least one projection therein.

3. The tube coupling assembly of claim 2, wherein the at least one projection comprises at least two projections and the at least one recess comprises at least two recesses, wherein the at least two projections are spacedly apart provided around an outer edge of the first member, the second member surrounds the second connector, and the at least two recesses are spacedly apart provided around an inner edge of the second member for receiving the at least two projections.

4. The tube coupling assembly of claim 3, wherein the first member has an inner space for receiving the first connector, comprises a flange on the rear end thereof and comprises an inner thread inside the first member; the second member has an inner shape corresponding with an outer shape of the second connector for mounting on the second connector;
    and the second connector has an outer thread for screwing with the inner thread of the first member.

5. The tube coupling assembly of claim 1, wherein the at least one projection is detachably mounted on the first member.

6. The tube coupling assembly of claim 1, wherein the at least one recess comprises at least two recesses are spacedly apart provided on an outer edge of the first member, and the at least one projection comprises at least two projections which are flexible are provided on the second member, wherein each projection of the at least two projections is shaped to be adapted with a corresponding recess of the at least two recesses.

7. The tube coupling assembly of claim 6, wherein the second member comprises a ring, and the at least two projections are provided on the ring.

8. The tube coupling assembly of claim 7, wherein the at least two projections each comprise a piece of metal sheet with one end fixed on the ring and the other end extend up and along the ring for a distance forming a shape corresponding with a corresponding recess of the at least two recesses of the first member.

9. The tube coupling assembly of claim 8, wherein an angle formed between the piece of metal sheet and surface of the ring is between 0-90 degrees.

10. The tube coupling assembly of claim 8, wherein the first member has an inner space for receiving the first connector, comprises a flange on the rear end thereof and has an inner thread inside the first member; the ring has an inner shape corresponding with an outer shape of a collar of the second connector for mounting on the second connector; and the second connector has an outer thread for screwing on the inner thread of the first member.

11. The tube coupling assembly of claim 10, wherein the collar of the second connector is disposed between the outer thread and a shoulder.

12. A tube coupling assembly, comprising:
- a first connector defining a longitudinal axis extending therethrough and having a first part on a rear end for connecting with an end portion of a tube and a second part with a larger outer diameter than the first part;
- a second connector jointed with the first connector, the second connector having the longitudinal axis extending therethrough, a shoulder having a hexagonal outer surface, a rear end for connecting to an end portion of another tube, and a front part for being received within the second part of the first connector, wherein the front part of the second connector and the second part of the first connector form a ball-nose fitting;
- a first member mounted over the first connector and threaded onto to the second connector;
- a second member slidably received over the second connector, the second member having a hexagonal inner surface;
- at least one projection inside a front end of the second member extending radially with respect to the longitudinal axis; and
- at least one recess on the first member,
- wherein each of the at least one projection is configured to be received in a corresponding recess of the at least one recess,
- wherein the at least one projection and the at least one recess engage the first member and the second member to prevent separation between the first connector and the second connector,
- wherein the hexagonal inner surface corresponds to the hexagonal outer surface so as to secure the shoulder of the second connector, and
- wherein the rear end of the second connector extends longitudinally past a distal surface of the second member.

13. The tube coupling assembly of claim 12, wherein the recess has an inclined groove and the projection comprises an inclined projection to be inserted into the recess.

14. The tube coupling assembly of claim 13, wherein at least two recesses are spacedly apart provided around an outer edge of the first member, the second member surrounds the second connector, and at least two projections are spacedly apart provided around an inner edge of the second member for inserting into the recesses.

15. The tube coupling assembly of claim 14, wherein the first member has an inner space for receiving the first connector, comprises a flange on the rear end thereof and an inner thread inside the first member, and the second connector has an outer thread for screwing on the inner thread of the first member.

* * * * *